United States Patent [19]

Herr

[11] 3,913,415
[45] Oct. 21, 1975

[54] CONTROL SYSTEM FOR MODULAR TRANSMISSION

[75] Inventor: Charles H. Herr, Peoria, Ill.
[73] Assignee: Caterpillar Tractor Co., Peoria, Ill.
[22] Filed: Apr. 8, 1974
[21] Appl. No.: 458,998

[52] U.S. Cl.............. 74/752 C; 74/336.5; 74/740; 74/767
[51] Int. Cl.[2]... F16H 3/74; F16H 5/48; F16H 37/02
[58] Field of Search.. 74/752 C, 751, 752 A, 752 B, 74/767, 753, 740, 336, 336.5

[56] References Cited
UNITED STATES PATENTS

| | | | |
|---|---|---|---|
| 2,136,971 | 11/1938 | Fleischel | 74/752 A |
| 2,204,872 | 6/1940 | Thompson | 74/752 C X |
| 2,260,406 | 10/1941 | Roche | 74/752 C X |
| 3,146,637 | 9/1964 | Whateley et al. | 74/781 R |
| 3,290,962 | 12/1966 | McCann et al. | 74/760 |

Primary Examiner—Samuel Scott
Assistant Examiner—John Reep
Attorney, Agent, or Firm—Phillips, Moore, Weissenberger Lempio & Strabala

[57] ABSTRACT

A control system for a power transmission includes a plurality of sequentially arranged speed ratio modules each having friction means responsive to a single signal for establishing either direct or reduction drive across the respective module, the control system including separate valves for selectively communicating the single signal to each respective module in response to governor means coupled with an output drive component of the transmission. A preferred embodiment of the control system is adapted for use in a power transmission where the speed ratio modules are of similar construction, each having a fixed housing forming a portion of an enclosure for the entire transmission, the valve means operated by the governor comprising a plurality of axially aligned abutting spools movable in unison by the governor and adapted to communicate the actuating signal to each respective module.

15 Claims, 21 Drawing Figures

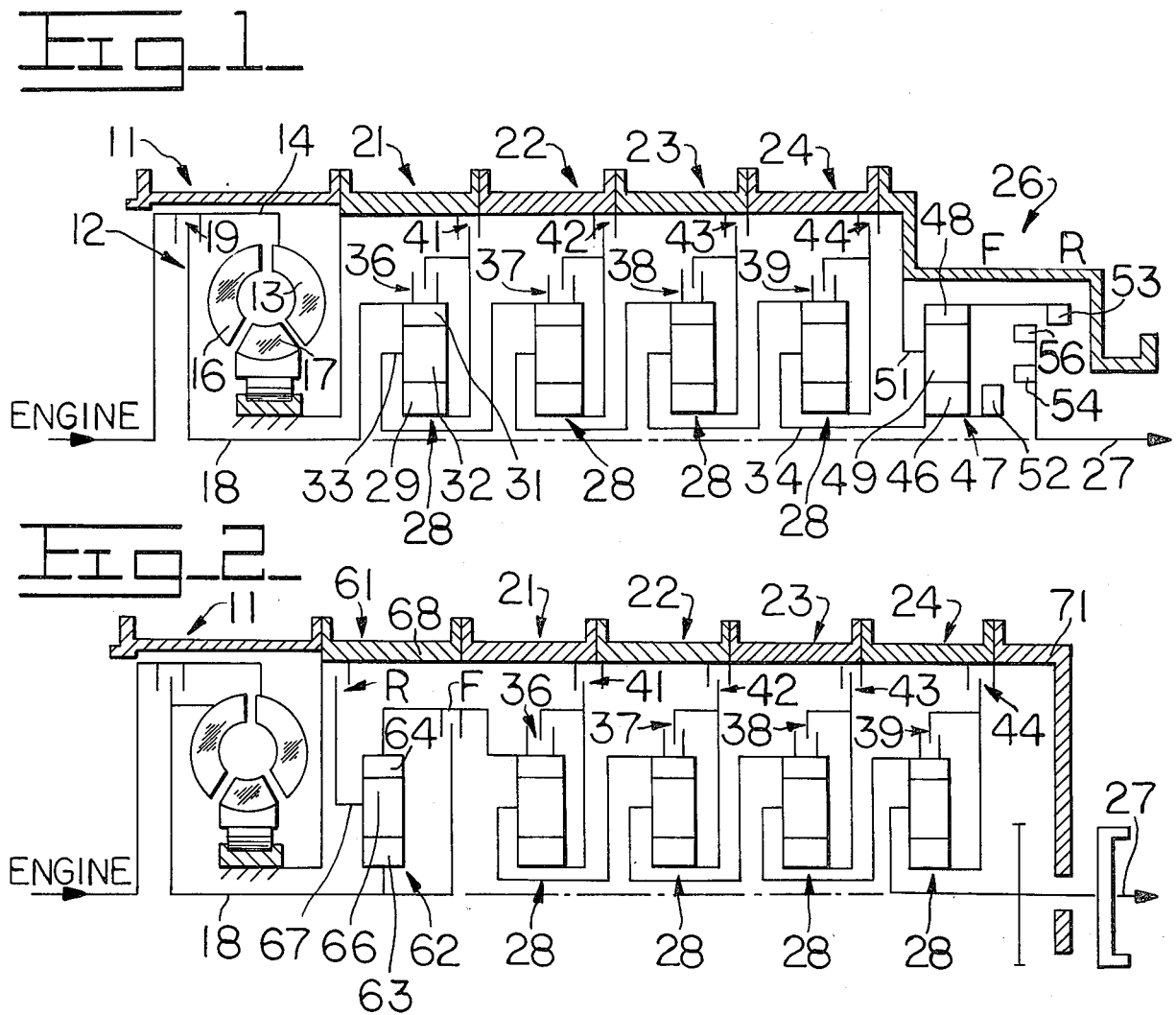

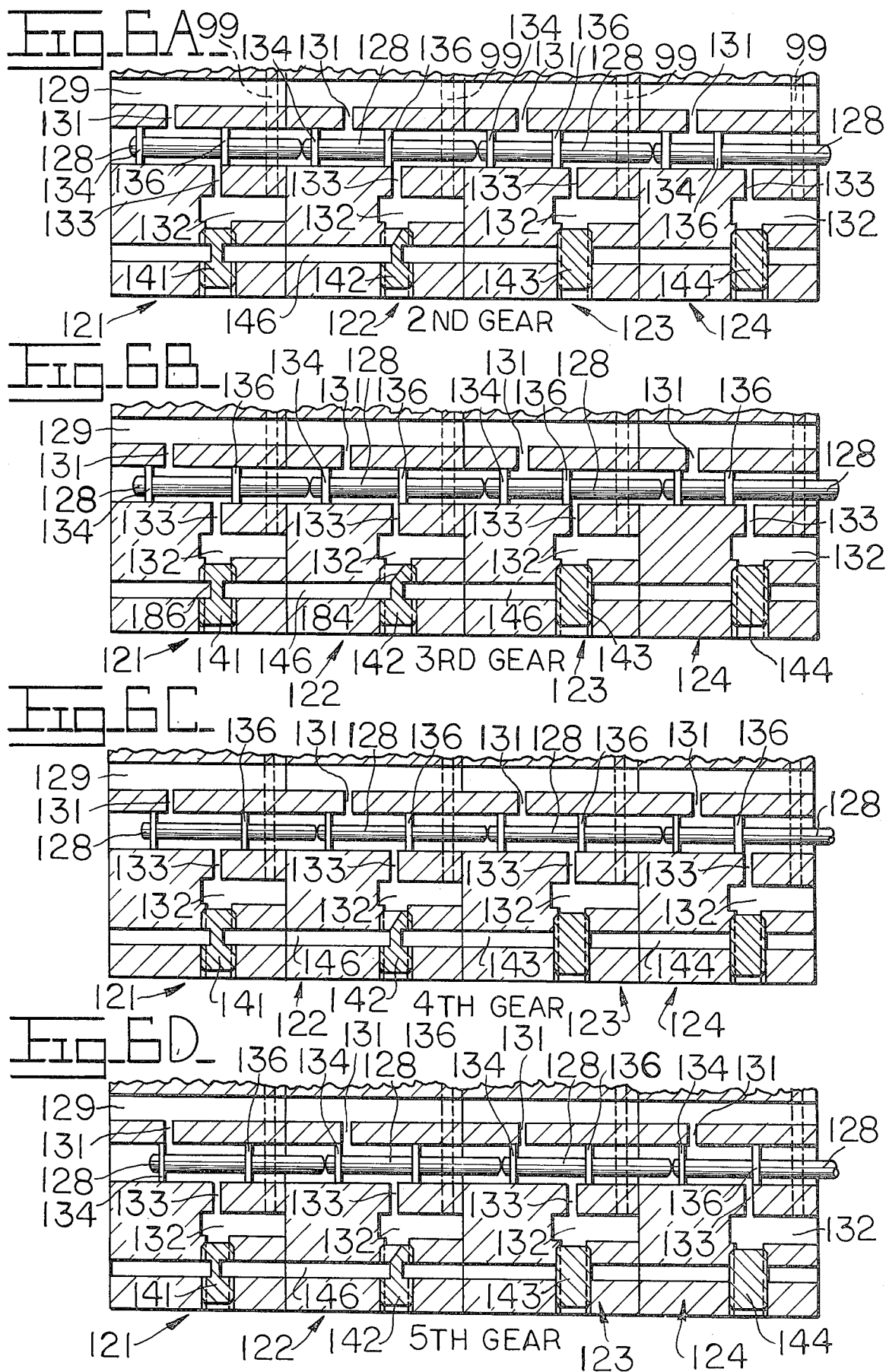

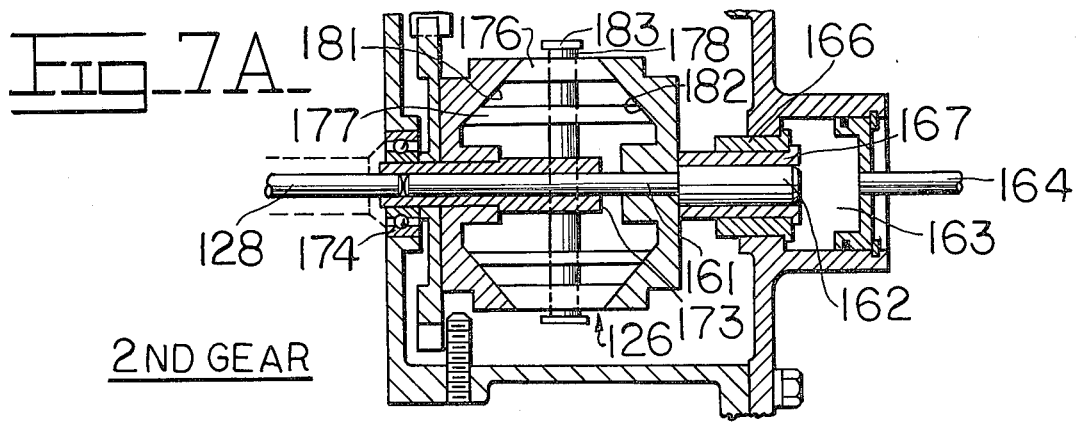
Fig. 7A — 2ND GEAR
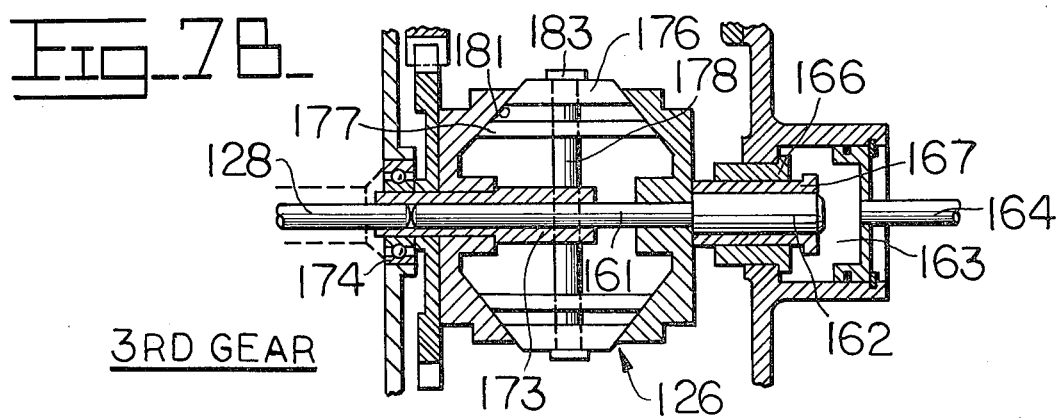
Fig. 7B — 3RD GEAR
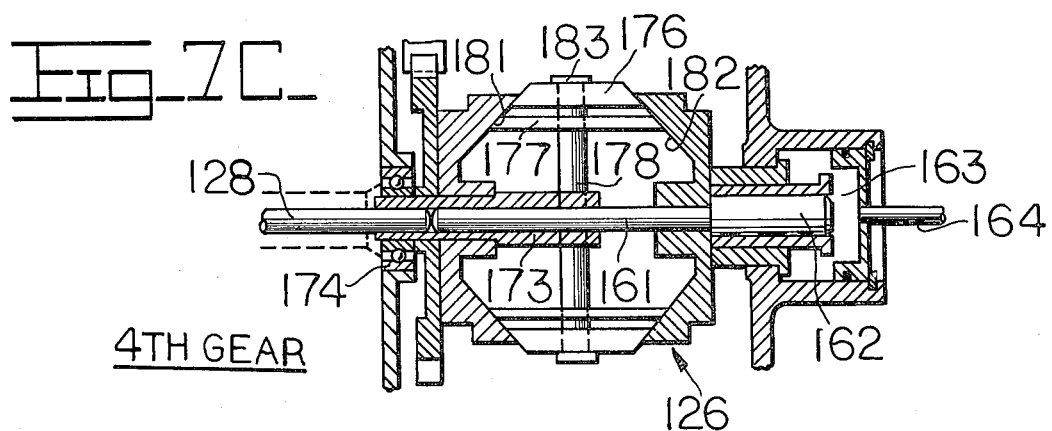
Fig. 7C — 4TH GEAR
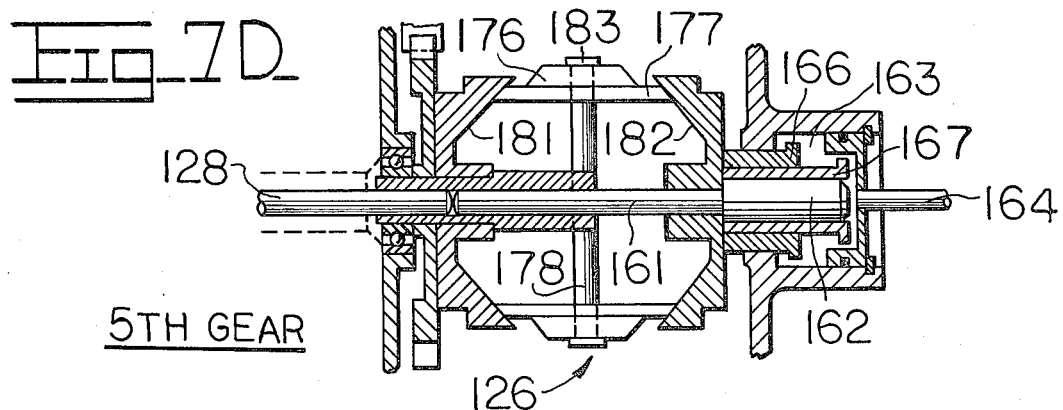
Fig. 7D — 5TH GEAR

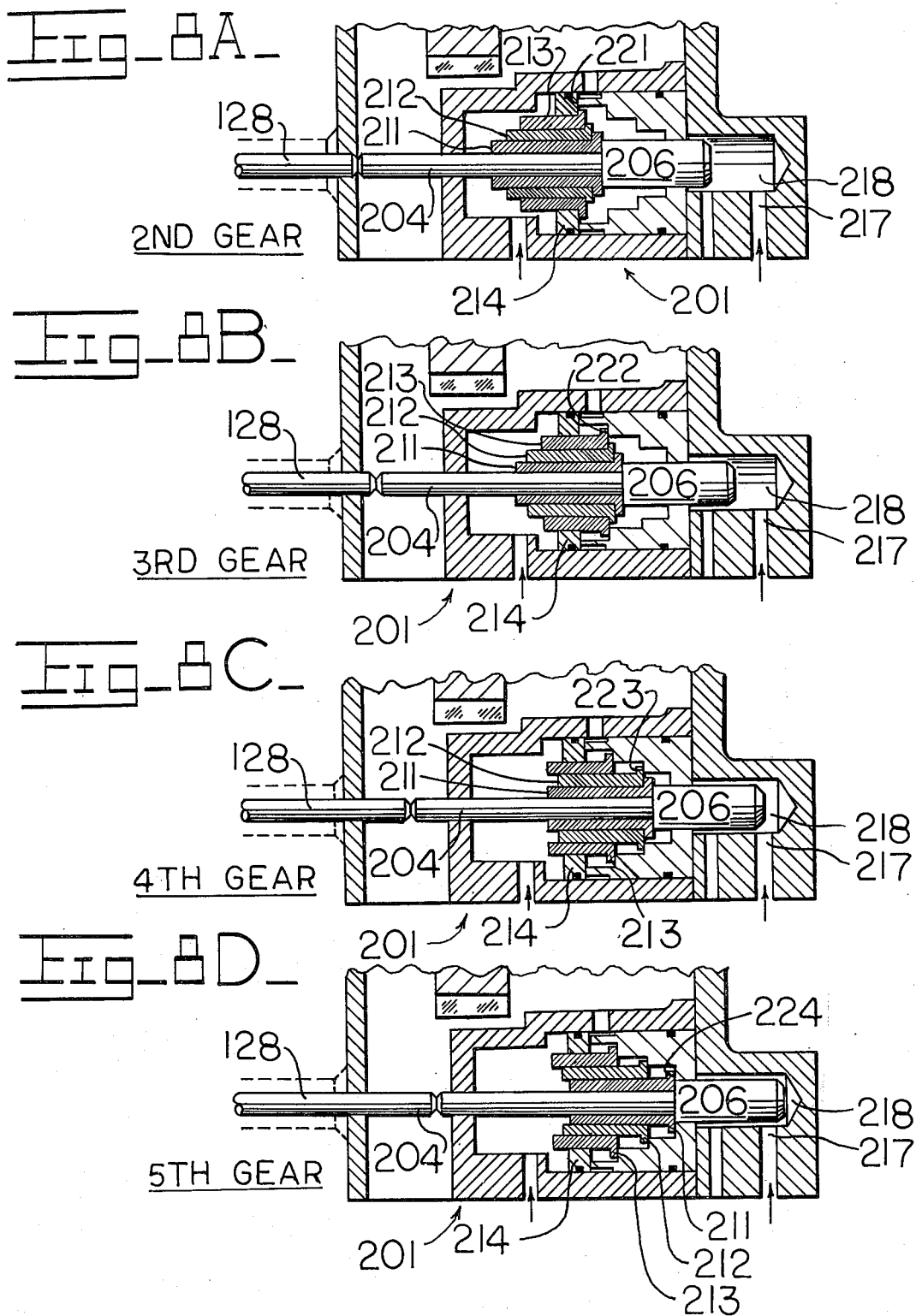

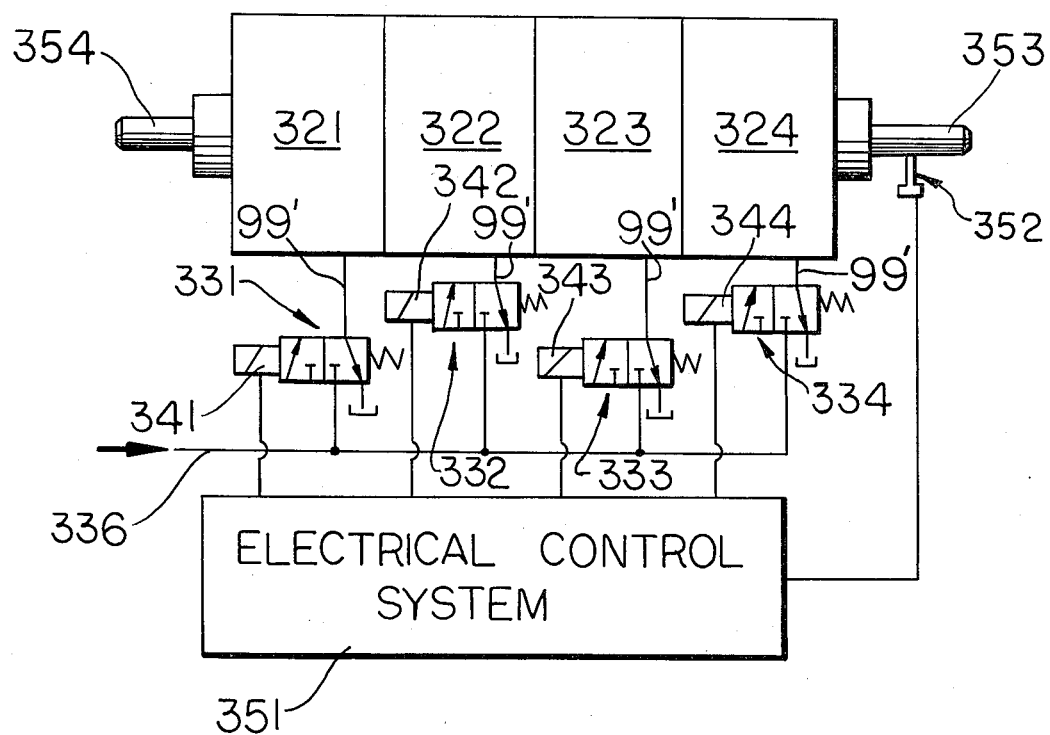

3,913,415

CONTROL SYSTEM FOR MODULAR TRANSMISSION

BACKGROUND OF THE INVENTION

The present invention relates to a control system for a power transmission comprising a plurality of sequentially arranged speed ratio modules. More particularly, the invention relates to such a control system adapted for use with a power transmission where each of the speed ratio modules may be selectively conditioned for direct and reduction drive by a single signal.

A modular power transmission of the type referred to above is the subject of a co-pending U.S. patent application Ser. No. 459,109, filed Apr. 8, 1974, entitled MODULAR POWER TRANSMISSION WITH SELF-ENERGIZING DEVICE, by Charles H. Herr and assigned to the assignee of the present invention.

The control system of the present invention is particularly intended for adaptation to the above-noted power transmission. However, the present control system is more broadly adaptable for use in conjunction with any power transmission having a plurality of sequentially arranged speed ratio modules including means for conditioning each speed ratio module to establish either direct or reduction drive in response to a single signal.

The present control system provides a particularly simple and reliable means for automatically controlling such a power shift transmission.

SUMMARY OF THE INVENTION

It is an object of the present invention to provide a power transmission including a plurality of sequentially arranged speed ratio modules including a control system with separate actuating means for regulating respective speed ratio modules in response to a governor means operatively coupled with an output drive component of the power transmission.

It is also an object of the present invention to provide a power transmission including a plurality of speed ratio modules each responsive to a single signal for establishing either direct or reduction drive with a control system including a separate actuating means for delivering the signal to each module in sequential response to a governor means operatively coupled with an output drive component of the transmission.

It is a further object of the invention to provide such a control system for a power transmission where the speed ratio modules are of similar construction, both the speed ratio modules and the control system being adapted for modular assembly to provide various combinations of power transmissions for different applications.

Additional objects and advantages of the present invention are made apparent in the following description having reference to the accompanying drawings.

DESCRIPTION OF THE DRAWINGS

FIG. 1 is a schematic representation of a modular power transmission particularly adapted for operation by the control system of the present invention.

FIG. 2 is a similar schematic representation of another power transmission adapted for operation by the control system of the present invention.

FIG. 3 is a tabular representation indicating the respective clutches and brakes to be engaged within the power transmission for establishing each operational speed ratio.

FIGS. 6A–D are each similar to a portion of FIG. 6 and illustrate actuating valves, for each of the speed ratio modules, in different operating positions corresponding to different operational speed ratios.

FIGS. 7A–D are similar to FIG. 7 while illustrating different operating positions of the governor corresponding respectively to the operating positions of the actuating valves illustrated in FIGS. 6A–D.

FIGS. 8A–D are similar views as FIG. 8 while illustrating different operating positions of the governor corresponding to the illustrations of FIGS. 7A–D.

FIG. 9 is a schematic representation of an electrical embodiment for governing operation of a power transmission according to the present invention.

DESCRIPTION OF THE PREFERRED EMBODIMENTS

Figure 4:
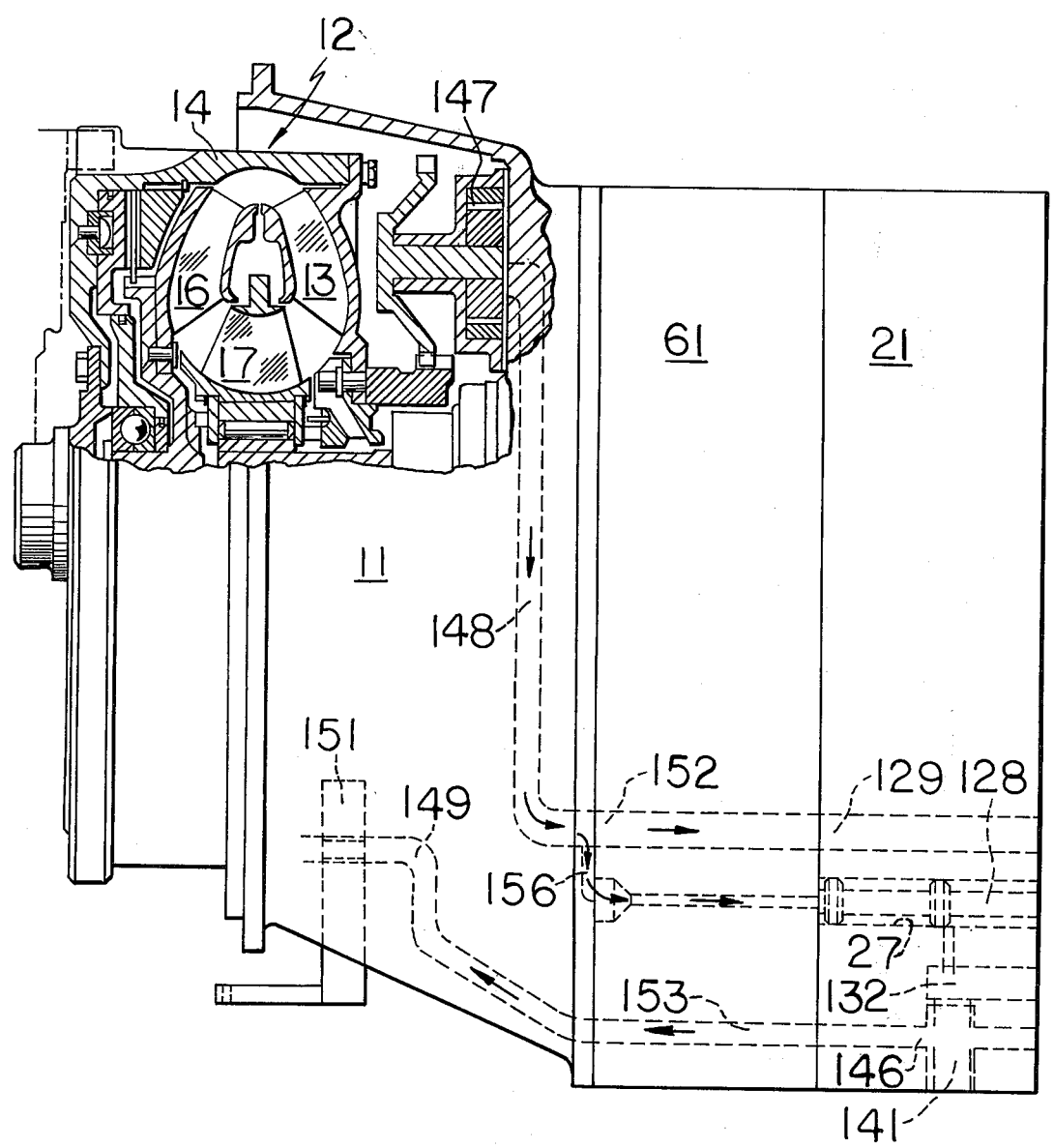
FIG. 4 is a partial side view of a power transmission of the type represented in FIG. 2 with parts being broken away to better illustrate a converter input module and also partially illustrating the control system of the present invention.

Referring now to the drawings, FIGS. 1 and 2 schematically represent power transmissions of the type comtemplated for use with the control system of the present invention. The power transmissions includes an input module 11 for receiving power from a prime mover such as an internal combustion engine. The input module 11 preferably comprises a torque converter 12 having its impeller element 13 coupled with the engine by means of an input element or rotatable housing indicated at 14. The turbine element 16 is conventionally associated with the impeller element 13 and a stator element 17 while also being coupled for rotation with an output shaft 18 of the torque converter module. A conventional lock-up clutch 19 is selectively operable to mechanically couple the input element 14 with the output shaft 18 in order to effectively by-pass the torque converter.

THE POWER TRANSMISSION OF FIG. 1

The input module 11 is sequentially coupled with one or more speed ratio modules preferably of modular construction as described below in order to permit the use of any number of speed ratio modules within a single power transmission. The transmission of FIG. 1 includes four such speed ratio modules indicated respectively at 21, 22, 23, and 24, the last speed ratio module for the power train being coupled with an output drive shaft in either forward or reverse.

Each of the speed ratio modules includes a planetary gear set 28 having a sun gear 29 and a ring gear 31. Planetary gears 32 are mounted upon a rotatable carrier element indicated at 33 while being in meshing engagement with both the sun gear 29 and the ring gear 31.

The ring gear 31 of the first speed ratio module 21 is coupled with the output shaft 18 of the torque converter module. The carrier element 33 delivers output power to ring gear 31 of the next adjacent speed ratio module 22. The carrier element 33 of the final speed ratio module 24 is coupled with a shaft 34 which also acts as an input for the directional module 26.

The speed ratio module 21 includes a direct drive clutch 36, which is engagable to couple its ring gear 31 for rotation together with the sun gear 29 of the same planetary gear set. The successive speed ratio modules 22, 23 and 24 have similar direct drive clutches indicated respectively at 37, 38 and 39. The direct drive clutches function upon engagement to provide a unitary drive ratio across the respective speed ratio modules.

Each speed ratio module also has a reduction brake indicated respectively for the four speed ratio modules of FIG. 1 at 41, 42, 43, and 44. Each reduction brake is selectively operable in a manner described in greater detail below to lock the respective sun gear 29 against rotation whereupon the planetary gears 32 are caused to rotate between the driven ring gear 31 and the fixed sun gear 29 to cause rotation of the associated carrier at reduced speed and increased torque.

The output shaft 34 from the final speed ratio module 24 is coupled with the sun gear 46 of a planetary gear set 47 in the directional module 26. The planetary gear set 47 also includes a ring gear 48 and a plurality of planetary gears 49 intermeshed between the sun gear 46 and ring gear 48 while being mounted upon a carrier element 51 which is fixed against rotation.

Directional transmission from the planetary gear set 47 to the output shaft 27 is established by sliding collar gears 54 and 56 into engagement respectively with the sun gear 52 and the ring gear 53. The collar gears 54 and 56 are arranged upon the output shaft 27 to drive the output shaft 27 in forward or reverse directions respectively.

The directional module 26 is quite efficient but requires substantially complete termination of movement in its planetary gear set 47 before shifting the collar gears 54 and 56 to change the direction of rotation of the output shaft 27. Accordingly, the directional module 26 is particularly contemplated for use in on-highway vehicles while another directional module is described below for use in applications requiring more rapid and/or more frequent directional changes. Requirements of this type are common in off-highway vehicles.

THE POWER TRANSMISSION OF FIG. 2

FIG. 2 represents such a power transmission particularly suited for example in off-highway vehicles. The power transmission of FIG. 2 is substantially similar to that of FIG. 1 in that it employs the same input and speed ratio modules indicated respectively at 11 and 21–24. However, the power transmission of FIG. 2 includes a different directional module 61 adapted to provide forward, reverse, or neutral depending upon actuation of friction clutches indicated respectively at F and R. The directional module 61 also includes a conventional planetary gear assembly 62 having a sun gear 63, a ring gear 64 and intermeshing planetary gears such as that indicated at 66 mounted upon a rotatable carrier 67. The sun gear 63 is coupled to the output shaft 18 from the converter module 11. The forward disc clutch F is operable to secure the sun gear 63 for rotation with the ring gear 64. The reverse disc clutch R is operable to secure the carrier element 67 to a fixed housing portion 68 and thereby prevents it from rotating in order to establish reverse drive across the directional module 61.

The output module 71 of the FIG. 2 embodiment includes the final output drive shaft 27 as well as conventional means (not shown) such as a speedometer drive and a parking gear, for example. The output module 71 also includes a governor as described in greater detail below for operating the control system of the present invention. Within the embodiment of FIG. 1, such a governor could be raised for example within the directional output module 26. It is also generally noted that within the FIG. 2 embodiment, a power take-off coupling is preferably not associated with the output module 71 but rather would be located between the converter module 11 and the directional module 61 in order to permit operation of the power take-off when the power transmission or vehicle is in neutral.

CONSTRUCTION OF THE SPEED RATIO MODULES

Construction of each of the modular speed ratio units 21–24 is described in substantial detail within the co-pending case noted above. However, a brief description of the speed ratio modules is set forth below to facilitate a complete understanding of the control system of the present invention.

Figure 5:
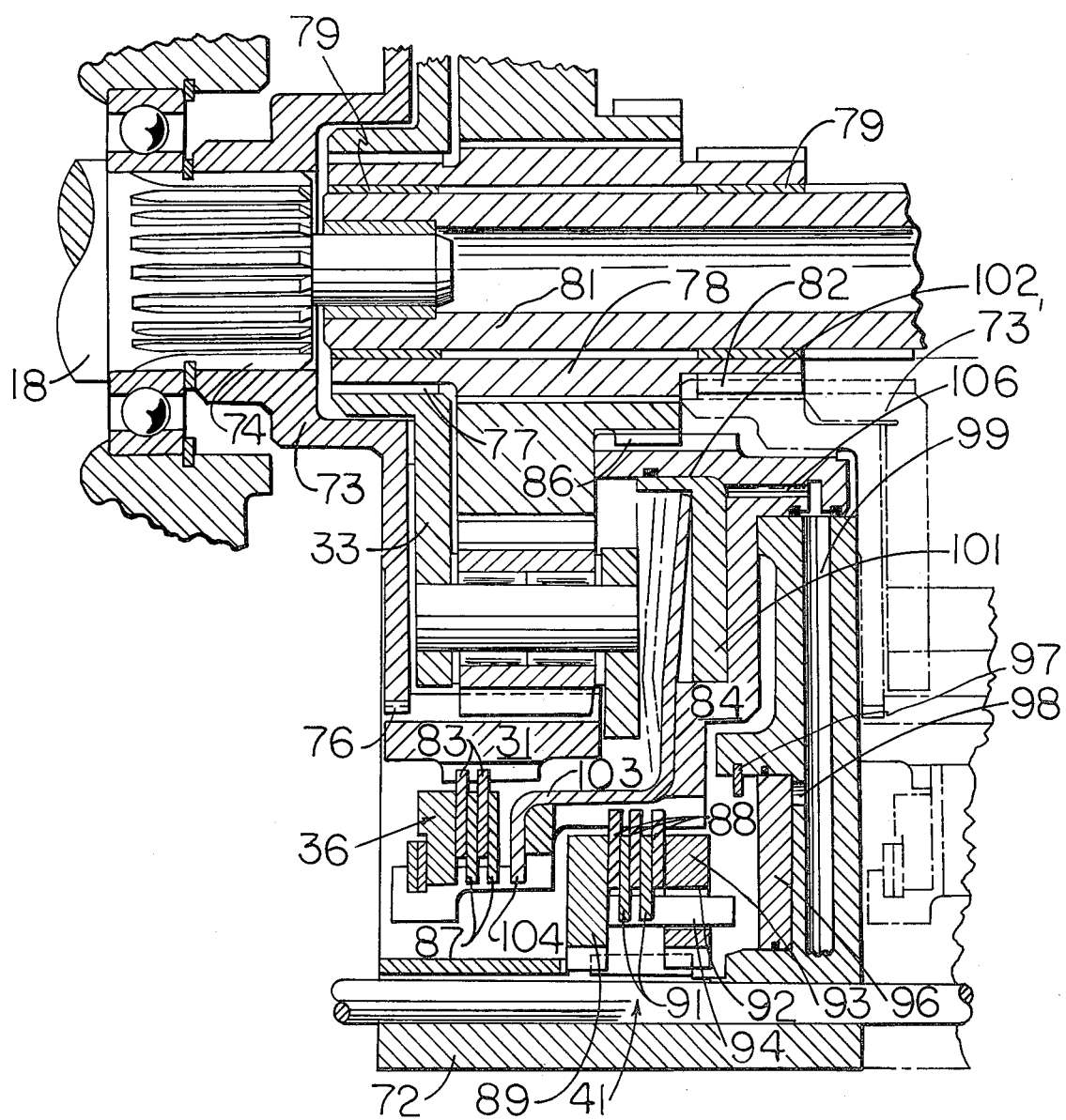
FIG. 5 is a fragmentary side view, with parts in section, of a speed ratio module adapted for use in the abovenoted power transmission and for operation by the present control system.

Internal construction of the speed ratio module 21 is illustrated in greater detail in FIG. 5 while the other speed ratio modules 22–24 are of substantially similar construction.

The module 21 includes a housing portion 72 which combines with the housing portions of the other modules to form a complete enclosure for the power transmission. The module 21 has an input gear 73 which is coupled, for example, by means of a spline connection 74 to the output shaft 18 of the converter module 11. The input gear 73 is also coupled for rotation with the ring gear 31 by means of a spline connection indicated at 76. The carrier element 33 of the speed ratio module 21 is coupled by means of a spline connection 77 with an output sleeve 78 which is supported by means of bearing mounts 79 upon a common center shaft 81.

A portion of the next adjacent speed ratio module 22 is also illustrated in FIG. 5. The output sleeve 78 is coupled by means of a spline connection 82 with an input gear 73' substantially similar to the input gear 73 noted above.

To provide a direct drive coupling across the speed ratio module 21, the direct drive clutch is engaged to effectively couple the ring gear 31 for rotation together with the sun gear 29. The ring gear 31 provides a first friction component for the direct drive clutch 36 and carries a plurality of friction discs 83. A common hub 84 is coupled with the sun gear 29 by means of a spline connection 86 and extends outwardly to annularly surround the ring gear 31. The hub 84 forms a second component for the direct drive clutch 36 and also carries a plurality of friction discs 87 which are arranged in interleaved relation with the friction discs 83.

The reduction brake 41 is particularly contemplated as being self-energizing to provide a selective coupling between the sun gear 29 and the fixed housing 72.

It is important at this point to note that the common hub 84 also acts as one friction component for the reduction brake 41. Accordingly, the common hub 84 carries another set of friction discs 88. A second split friction component for the reduction brake 41 is formed by a drum 89 carrying a plurality of friction discs 91 in interleaved relation with the friction discs 88. The second friction component of the reduction brake 41 also includes a reaction disc 92 which is secured for rotation with the drum 89 while being axially movable in relation thereto. Axial movement between the drum 89 and reaction disc 92 serves to regulate engagement and disengagement between the interleaved friction discs 88 and 91. The reaction disc 92 also includes a plurality of axially extending slots 93 formed about its periphery. The drum 89 has a plurality of axially extending fingers 94 which penetrate the slots 93 for the purpose of permitting positive disengagement of the reduction brake 41.

The reduction brake 41 is described in substantially greater detail within the co-pending case noted above. However, the components described above are sufficient to permit an understanding of a common control apparatus for simultaneously conditioning the direct drive clutch 36 and the reduction brake 41 to establish a preferred manner of torque transmission through the speed ratio module 21.

The clutch drum 89 may be maintained in a position shifted axially away from the reaction disc 92 by means of a blocker piston 96 slidably arranged in axial alignment with the fingers 94. Leftward movement of the blocker piston 96 is limited by a retaining ring 97 with the piston 96 being movable in response to fluid under pressure received through a communicating passage 98 from a common fluid passage 99.

Another actuating piston 101 for the direct drive clutch is slidably arranged within a cavity 102 formed by the common clutch hub 84. The piston 101 interacts with a finger spring 103 having an extending portion 104 arranged to selectively provide clamping force for the interleaved friction discs 83 and 87 of the direct drive clutch 36.

Hydraulic fluid for shifting the piston 101 leftwardly against the finger spring 103 is communicated from the common fluid passage 99 through a restrictive orifice 106. As fluid pressure is introduced into the common passage 99, it immediately shifts the blocker piston 96 lefwardly to assure axial separation between the clutch drum 89 and the reaction disc 92. Almost simultaneously, fluid from the passage 99 acts against the piston 101 to shift both the piston 101 and finger spring 103 leftwardly to clamp the interleaved friction discs 83 and 87 together and establish an engaged condition for the direct drive clutch 36. However, the restrictive effect of the orifice 106 and the spring effect of the finger spring 103 serve to modulate engagement of the direct drive clutch 36 and thus facilitate shifting of the speed ratio module 121 into or out of a direct drive condition.

The common control arrangement described above, particularly simplifies and facilitates operational control over the power transmission. For example, the speed ratio module 21 may be upshifted into a direct drive condition by a single fluid pressure signal introduced into the common fluid passage 99. Similarly, the speed ratio module may be downshifted from a direct drive condition into a condition where the reduction brake 41 functions automatically to provide reduction drive by simply evacuating fluid pressure from the common passage 99. The provision of the common hub 84 has a friction component in each of the direct drive clutch 36 and the reduction brake 41 obviates or eliminates the need for complex apparatus to assure proper timing in the control system for these two friction devices while also assuring continuous torque transmission across each speed ratio module during speed ratio shifts.

The reduction 41 is self-energizing in either direction when the respective speed ratio module is in a reduction drive mode. The brake 41 may be also conditioned by the blocker piston to act as an overruning clutch when the respective speed ratio module is in a direct drive mode.

The modular transmission disclosed above is preferred for use in a power transmission according to the present invention. However, it is believed obvious that the control system of the present invention, as described below, may also be used in other power transmissions where the clutch or friction means of the various modules are conditioned for response to a single signal in order to selectively establish either direct or reduction modes of operation.

THE CONTROL SYSTEM

Figure 6:
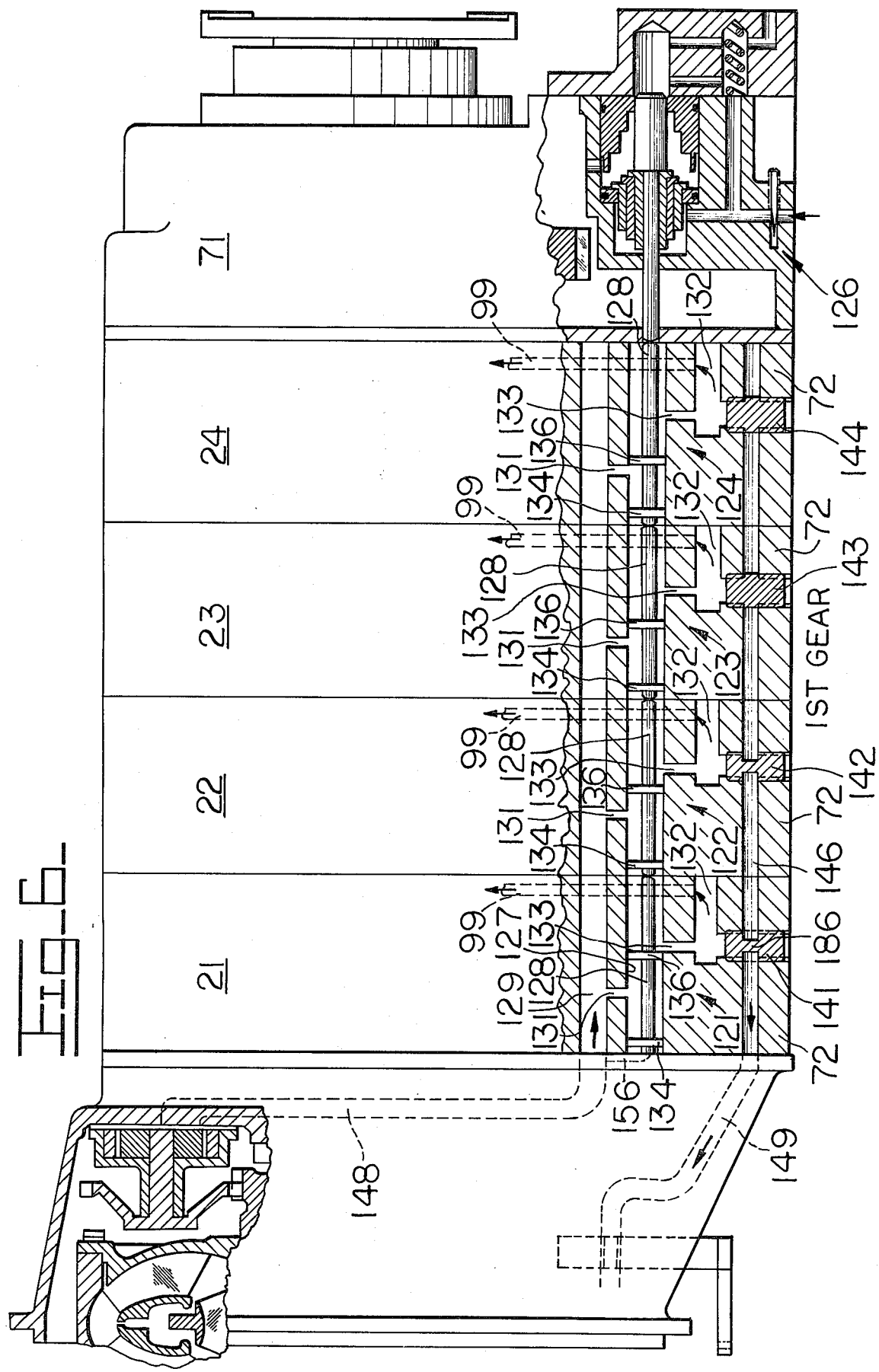
FIG. 6 is a partial side view of a power transmission with parts broken away to illustrate a control system for operating sequential speed ratio modules within the transmission.

The control system of the present invention as shown in FIG. 6 preferably includes a separate valve arrangement 121–124 associated with each of the speed ratio modules 21–24 respectively to sequentially deliver a hydraulic fluid signal into each of the common passages 99 in response to a governor indicated generally at 126.

The valves 121–124 are of substantially identical construction. Accordingly, the following description of the valve 121 may also be applied to the other valves 122–124. The housing portion 72 of each speed ratio module is formed to receive various portions of the valve 121 in order to facilitate modular assembly of the power transmission. The housing 72 forms a bore 127 within which a valve spool 128 is axially movable. The housing 72 also forms an inlet passage 129 which is in communication with the bore 127 by means of a cross passage 131. The bore 127 is also in communication with a signal chamber 132 by means of another passage 133 which is axially off-set along the bore 127 from the passage 131. The chamber 132 is also in communication with the common passage 99 which was also described above with reference to FIG. 5.

The inlet passages 129 for each of the valves 121–124 are axially aligned to form a fluid conduit extending completely across the sequence of speed ratio modules 21–24. The right end of the inlet passage 129 for the final speed ratio module 24 is closed by engagement of the speed ratio module 24 with the output module indicate at 71. The valve bores 127 for the respective valves 121–124 are also axially aligned to form a single valve bore also extending through the sequence of speed ratio modules 21–24. Each of the valve spools 128 is substantially the same length as the respective speed ratio module 21–24. This permits any number of speed ratio modules to be assembled into a single power transmission without need to alter or adjust the respective valve assemblies 121–124.

The valve spools 128 are arranged in axially abutting engagement with each other. Each spool has a first land 134 arranged at a leftward end thereof and a second land 136. The first lands 134 are arranged in the same location upon each of the spools 128. However, the second lands 136 are spaced rightwardly from the first land by a progressively diminishing distance for each of the successive valves 122, 123, and 124. This feature permits the valves to sequentially communicate fluid from the inlet passage 129 to the chambers 132 for each of the valves as the axially abutting assembly of valve spools 128 is shifted rightwardly in a manner described in greater detail below.

It may also be seen from FIG. 6 that each of the chamber 132 is in communication with valve plugs respectively indicated at 141–144. The valve plugs are designed to regulate fluid communication from the chambers 132 to a common passage 146 which is in actuating communication with the lock-up clutch 19 illustrated in FIGS. 1 and 2.

Referring also to FIG. 4, signal fluid under pressure is provided for the valves 121–124 by a pump 147 which is coupled for rotation with the input element or rotatable housing 14 of the torque converter 12. Fluid under pressure from the pump 147 is communicated to the inlet passage 129 by means of a passage 148 formed within the converter module 11.

The converter module 11 also forms another passage 149 for communicating actuating fluid to the lock-up clutch 19. The valves 121–124 are preferably configured to automatically provide for engagement of the lock-up clutch 19 in second gear or above depending on the selection of valve plugs 141–144. However, engagement of the lock-up clutch can be overridden by means of a control valve 151 which is manually operable to selectively block the passage 149.

The axial arrangement of valves 121–124 as illustrated in FIG. 6 is not designed to regulate forward and reverse operation of the power transmission. Accordingly, when the directional module 61 is inserted between the torque converter module 11 and the first speed ratio module 21 as illustrated in FIG. 2, its housing merely provides fluid passages for communicating the control valves with the torque converter module. For example, a passage 152 communicates the pump outlet passage 148 in the torque converter module 11 with the inlet passage 129 of the first speed ratio module 21. Similarly, a passage 153 communicates the passage 146 of the speed ratio module 21 with the passage 149 in the converter module 11. Still another passage 154 is in communication with the valve spool bore 127 of the first speed ratio module 21. The left end of the passage 154 is in communication with a small branch passage 156 from the pump outlet passage 148. The branch passage 156 is preferably sized to communicate a pressure of approximately 15 psi, for example, against the left end of the valve spool 128 in the first valve assembly 121. The purpose of this pressure is to maintain abutting engagement of the sequence of the valve spools 128 and to urge the assembly of valve spools rightwardly to maintain them in contact with a portion of the governor 126 as described below.

THE GOVERNOR EMBODIMENT OF FIG. 7

Figure 7:
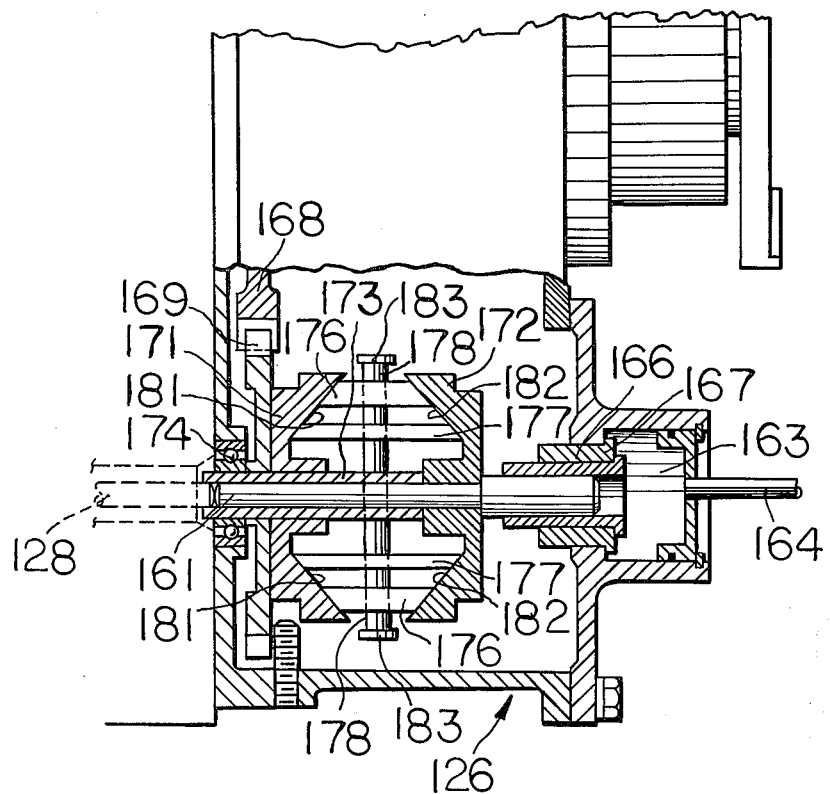
FIG. 7 is an enlarged fragmentary view illustrating a governor arrangement which also appears at the right end of FIG. 6.

Referring now to FIG. 7 as well as FIG. 6, the mechanical governor 126 within the output module 71 includes an axially movable governor support shaft 161 which is in abutting engagement with the valve spool 128 of the last sequential speed ratio module 24. An enlarged end portion 162 of the governor support shaft 161 extends into a chamber 163 which is pressurized to approximately 30 psi, for example, by fluid pressure communicated from the pump 147 through a conduit partially indicated at 164. The fluid pressure within the chamber 163 urges the governor's support shaft 161 leftwardly as viewed in each of FIGS. 6 and 7 to accordingly act leftwardly upon the axially abutting sequence of valve spools 128. The pressure within the chamber 163 thus assures that the governor's support shaft 161 and the valve spools 128 remain in a leftwardly shifted direction until affected upon by the mechanical governor 126. Cluster sleeves 166 and 167 encompass the enlarged end portion 162 of the governor's support shaft to perform a dual function. Initially, the sleeves provide a rotatable differential bearing support for the governor shaft portion 162. The sleeves 166 and 167 additionally provide stepped resistance to movement of the governor support shaft 161 by the governor 126 as described in greater detail below.

The mechanical governor 126 is driven by an output gear 168 in the module 71 through a step-up gear 169. The gear 169 is coupled for rotation with first and second cam members 171 and 172 which are interconnected by means of a sleeve 173 surrounding the governor support shaft 161. Accordingly, the entire governor assembly is supported for rotation at its right end by means of the cluster sleeves 166 and 167 and at its left end by means of a bearing indicated at 174.

The mechanical governor also includes two pairs of rectangular weights 176 and 177 which are supported respectively by pins 178 arranged approximately 180° apart. The pins 178 are interconnected while being free to move axially with the entire governor assembly and the governor support shaft 161.

Faces 181 and 182 angularly formed respectively on the cam members 171 and 172 provide cam surfaces against which the weights 176 and 177 interact. Rotation of the governor assembly causes the weights 176 and 177 to move outwardly under the influence of centrifugal force. Since the cam member 171 is prevented from moving leftwardly, outward movement of the weights causes the other cam member 172 to move rightwardly against the enlarged end portion 162 of the governor's support shaft.

Axial movement of the governor support shaft is determined by centrifugal force acting selectively upon the two pairs of weights as well as hydraulic resistance tending to prevent rightward movement of the enlarged shaft portion 162 and the sleeves 166 and 167.

The governor 126, as illustrated in each of FIGS. 6 and 7, is positioned corresponding to rotating speed in the output module 71 for establishing a first gear speed ratio within the assembled speed ratio modules 21–24. Referring also to FIG. 5, it may be seen that reduction drive across each of the speed ratio modules 21–24 is established by an absence of fluid pressure in the respective common passages 99. Automatic operation of the control system to condition the speed ratio modules 21–24 for higher gears of operation is described immediately below having reference also to FIGS. 6A–D and FIGS. 7A–D.

As the output gear 168 approaches a rotating speed selected for a shift to second gear, the weights 176 and 177 move outwardly to a position indicated in 7A where the cam member 172 is shifted rightwardly until it abuts the inner cluster sleeve 167. Fluid pressure within the chamber 163 acting upon both the shaft portion 162 and cluster sleeve 167 is sufficient to prevent further rightward movement of the cam member 172. However, fluid pressure in the branch passage 156 causes the axially arranged spools 128 to be shifted rightwardly into the position illustrated in FIG. 6A to maintain contact with the governor support shaft 161. The large axial spacing between the lands 134 and 136 on the spool 128 of the speed ratio module 21 permits communication from the inlet passage 129 to the actuating chamber 132. Accordingly, a single fluid signal is communicated into the common passage 99 and conditions the first speed ratio module 21 for direct drive in a manner described above with reference to FIG. 5. Thus, second gear is automatically established with the first speed ratio module 21 being in a direct drive mode while the other speed ratio modules 22– 24 remain in reduction drive modes.

Referring again to FIG. 7, as the output gear 168 approaches a rotating speed selected for an automatic shift to third gear, the weights 176 and 177 are again shifted outwardly under the influence of centrifugal force until the outer weights 176 abut flanges 183 formed at the radially outer ends of the pins 178. The weights 176 are thus restrained from further movement. Centrifugal force acting upon the other weights 177 alone is not sufficient at the selected speed to cause further movement of the cam member 172.

With the governor support shaft 161 being in the position illustrated by FIG. 7B, the valves 128 assume the position illustrated in FIG. 6B. The valve 128 of the first speed ratio module continues to provide fluid communication to its common passage 99 while the spool 128 of the second speed ratio module 22 is also positioned to communicate fluid through its chamber 132 to the common passage 99 of the speed ratio module 22. Thus, both of the first and second speed ratio modules 21 and 22 are conditioned for direct drive with the other speed ratio modules 23 and 24 remaining in reduction drive.

Referring again to FIG. 7, as the output gear 168 approaches a rotational speed selected for an automatic shift into fourth gear, the weights 177 cause the cam member 172 to shift even further to the right into a position illustrated in FIG. 7C where the cam member 172 also abuts the outer cluster sleeve 166. At this point, further movement of the cam member to the right is resisted by fluid pressure in the chamber 163 acting upon the enlarged shaft portion 162 as well as the ends of each of the cluster sleeves 166 and 167. The valve spools 128 are thus shifted into the positions illustrated in FIG. 6C to also cause the third speed ratio drive module 23 to be conditioned for direct drive.

Finally, as the output gear 157 approaches a rotating speed selected for a shift into fifth gear, the weights 177 are restrained from further movement by the flanges 183. The governor support shaft is positioned as illustrated in FIG. 7D while the valves 128 are positioned as illustrated in FIG. 6D. At this point, each of the valves 128 is communicating a hydraulic fluid signal to the common passage 99 of each speed ratio module. Accordingly, each of the four speed ratio modules is conditioned for direct drive corresponding to fifth gear operation of the power transmission.

It will be obvious from the above description that as the output gear 168 experiences a reduced speed of rotation, the governor support shaft 161 and the valve spools 128 will be shifted incrementally toward the left, in a reverse manner as described above, to automatically condition the speed ratio modules 21–24 for operation in lower speed ratios.

As noted above, the lock-up clutch (see FIGS. 1 and 2) is preferably engaged within all speed ratios above second gear. Accordingly, the second valve plug 142 is formed with an outlet passage 184 to communicate fluid from the corresponding actuating chamber 132 into the conduit 146 when the corresponding valve spool 128 is positioned as illustrated in FIG. 6B. The first valve plug 141 is formed with an annular groove 186 to permit by-pass flow of fluid through the conduit 146 while preventing direct fluid communication between the first actuating chamber 132 and the passage 146. Through this arrangement, actuating fluid continues to be communicated into the passage 146 as the spools 128 are shifted further to the right to establish higher operating speed ratios. The third and fourth valve plugs are of substantially solid construction merely to prevent fluid communication from the passage 146 into their respective actuating chamber 132 in order to prevent undesired pressurization of the common passages 99 in the speed ratio modules 23 and 24.

THE GOVERNOR EMBODIMENT OF FIG. 8

An alternate embodiment of a fully hydraulic governor, similar in operation to that described above with reference to FIGS. 7 and 7A–D, is illustrated in FIGS. 8 and 8A–D. The hydraulic governor 201 of FIG. 8 may also be arranged within an output module such as that indicated at 71 in FIG. 6. The hydraulic governor includes a conventional hydraulic pump 202 driven by the output gear 168 of the output module and is adapted to provide an outlet pressure proportional to its operating speed as determined by the output gear 168. Variable pressure from the pump 202 is communicated to the governor 201 through a passage 203.

The hydraulic governor 201 also includes a governor support 204 having an enlarged end portion 206. The governor support shaft 204 functions in substantially the same manner as the governor support shaft 161 of FIG. 7 to selectively position an axially arranged plurality of spools 128 as illustrated in FIG. 6. The spool 128 for the final speed ratio module 24 is partially illustrated in FIG. 8.

The governor support shaft 204 is ]lso supported by a plurality of cluster sleeves or annular pistons indicated respectively at 211, 212, 213 ]nd 214. One axial end of each of the cluster pistons 211–214 is responsive to fluid pressure communicated into a chamber 216 from the inlet passage 203. Each of the cluster pistons 211, 212 and 213 is flanged for interconnection with the next adjacent piston 212–214, respectively.

Similar to the arrangement of FIG. 7, fluid pressure from the torque converter pump 147 (see FIG. 4) is communicated through a passage 217 into a chamber 218. Fluid pressure of approximately 30 psi, for example, is developed within the chamber 218 and tends to urge the governor support shaft leftwardly in a similar manner as described above with reference to the embodiment of FIG. 7.

An adjustable screw valve 219 provides flow control through the passage 203 into the chamber 216. A relief valve 221 may also be employed along the passage 217 for limiting pressure within the chamber 218 in order to balance high peak pressures which might otherwise act upon the governor support shaft 204 after shifting into a higher gear. In a first speed ratio condition as illustrated in FIG. 8, pressure developed within the chamber 218 is sufficient to overcome governor pump pressure developed within the chamber 216 in order to maintain the cluster pistons 211-214 in their leftwardly shifted positions.

Figure 8:
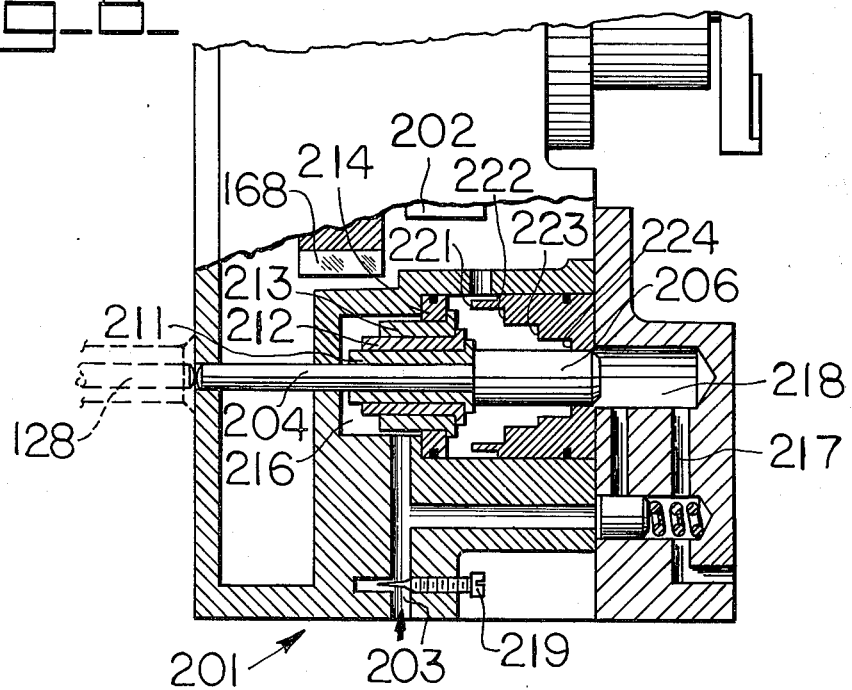
FIG. 8 is a fragmentary view illustrating another embodiment of a governor employable, for example, in place of the governor illustrated at the right end of FIG. 6.

As the output gear 168 and pump 202 approach a rotating speed selected for an automatic shift to a second speed ratio, the cluster pistons 211-214 are shifted rightwardly until the outer piston 214 engages a stop indicated at 221 (see FIGS. 8 and 8A). The outer cluster piston 221 is thereafter restrained from further movement in a rightward direction. Accordingly, fluid pressure developed within the chamber 216 is insufficient to shift the remaining cluster pistons 212-214 further to the right. With the cluster pistons in the position illustrated in FIG. 8A, the governor support shaft 204 is moved sufficiently to the right in order to permit the valve spool 128 of the first speed ratio module 21 to establish a direct drive thereacross (also see FIG. 6A).

As operating speed of the output gear 168 and pump 202 further increase toward a rotating speed selected for an automatic shift into a third gear or speed ratio, the remaining cluster pistons 212-214 are further shifted to the right until the piston 213 engages a stop indicated at 222 (see FIG. 8B). Thereafter, fluid pressure within the chamber 216 is insufficient to shift the remaining cluster pistons 211 and 212 further to the right. Accordingly, the governor support shaft 204 is positioned so that the valve spools 128 of both the first and second speed ratio modules 21 and 22 (also see FIG. 6) are positioned to establish a direct drive condition therein.

Referring to FIG. 8C, as the output gear 168 and pump 202 approach an incrementally higher rotating speed selected for an automatic shift into a fourth gear or speed ratio, the piston 212 engages a stop 223 to momentarily limit rightward movement of the governor support shaft 204.

As rotating speed of the output gear 168 and pump 202 further increase toward a speed selected for automatic shifting into a fifth gear or speed ratio, increased pressure within the chamber 216 is sufficient to move the remaining piston 211 agains a stop 224. The governor's support shaft is then in a rightwardly shifted position so that the valve spools 128 of all four speed ratio modules 21-24 are positioned to communicate fluid pressure into the common passages indicated at 99 in order to establish the fifth speed ratio condition for the power transmission.

Here again, with the hydraulic governor illustrated in FIG. 8, it is obvious that as operating speed of the output gear 168 and pump 202 are again reduced, the valves 121-124 of FIG. 6 will again shift toward the left to incrementally recondition the speed ratio modules 24, 23, 22 and 21 for operation in a reduction mode.

An electrical equivalent of the governors 126 and 201 described above is illustrated in FIG. 9. Speed ratio modules 321-324 correspond to the modules 21-24 of FIGS. 1 and 2 in that they are each hydraulically responsive to a single signal received through a common fluid passage 99'.

Separate valves 331-334 are respectively communicated with the common passages 99' of the modules 321-224 and an inlet conduit 336 receiving signal fluid under pressure from a source such as that indicated at 147 in FIG. 4. The valves 331-334 are normally positioned to communicate the respective passages 99' to drain. In accordance with the foregoing description, evacuation of the passages 99 conditions the modules 321-324 for operation in a reduction mode.

The valves 331-334 may be respectively shifted by solenoids 341-244 to sequentially communicate a fluid signal to the respective passages 99'.

The solenoids are electrically actuated to shift the respective valves by a common electrical control assembly 351 which in turn is conventionally responsive to a speed sensor such as the magnetic pickup 352. The pickup 352 senses rotating speed of a final drive shaft 353 for the speed ratio modules 321-324.

Input power for the speed ratio modules is provided by an input shaft 354 corresponding to the input shaft 18 of FIG. 1.

Initially, the power transmission of FIG. 12 may function in a first speed ratio with the valves 331-334 positioned as shown to evacuate the common passages 99'. This establishes each 321-the modules 324-324 in a reduction mode. As the output shaft 353 approaches a speed selected for a shift into a second speed ratio, the sensor 352 signals the control assembly 351 which responds by actuating the first solenoid 341. Actuation of the solenoid 341 shift the valve 331 and establishes direct drive through the first speed ratio module 321.

Similarly, as the output shaft approaches speeds selected for shifts into higher speed ratios, the sensor 352 causes the control assembly to sequentially actuate the solenoids 342-344. The valves 332-334 are thus sequentially shifted to respectively condition the speed ratio modules 322-4 for operation in a direct mode. As with the preceding embodiments, the control assembly 351 and sensor 352 conversely function in response to decreasing speed of the output shaft to sequentially deactuate the solenoids 344-341 and establish sequentially lower speed ratios across the combined speed ratio modules 321-324.

I claim:

1. A power transmission including a plurality of sequentially arranged speed ratio modules, each of the modules comprising an input shaft,
an output shaft,
a planetary gear set having a sun gear, a ring gear and a plurality of planetary gears mounted upon a rotatable carrier and engaged with the ring gear and the sun gear, the input shaft being coupled for rotation with the ring gear and the output shaft being coupled with rotation with the carrier,
a direct drive clutch selectively operable to cause rotation of the ring gear together with the carrier,
a reduction brake selectively locking the sun gear against rotation, and
control means for operating both the direct drive clutch and reduction brake in response to a single hydraulic signal,
the power transmission also including a control system comprising a source of signal fluid under pressure, conduit means for communicating the signal fluid to each of the speed ratio modules, a separate valve means for selectively communicating the conduit means with the control means of the respective module, and governor means operatively coupled with a final output drive shaft of the power transmission and each of the valves to condition the valves for sequentially communicating signal fluid to the respective modules relative to operating speed of the output shaft, the plurality of separate valve means for the plurality of speed ratio modules each comprising a spool means of substantially the same length as the axial dimension of the respective module, the plurality of spool means being arranged in abutting relation within a bore extending continuously through the sequentially arranged speed ratio modules.

2. The power transmission of claim 1 wherein the control means comprises means for operating the direct drive clutch and reduction brake in response to a single hydraulic signal received through a common fluid passage, the separate valve means for the speed ratio modules each being in communication with the respective common fluid passage.

3. The power transmission of claim 2 wherein the reduction brake includes means selectively operable to initiate self-engagement in response to rotation of the sun gear.

4. The power transmission of claim 1 wherein the reduction brake is self-energizable.

5. The power transmission of claim 4 wherein the control means comprises actuating piston means operatively coupled with the direct drive clutch and the reduction brake, the actuating piston means being responsive to fluid pressure in a common passage in communication with the respective valve means.

6. The power transmission of claim 1 wherein the control means comprises actuating piston means operatively coupled with the direct drive clutch and the reduction brake, the actuating piston means being responsive to fluid pressure in a common passage in communication with the respective valve means.

7. The power transmission of claim 1 wherein the governor means comprises operating means arranged for interaction with one end of the continuously extending spool means.

8. The power transmission of claim 7 wherein the governor means comprises mechanical means incrementally responsive to rotating speed of the final output drive shaft for adjusting the operating means and its interaction with the continuously extending spool means.

9. The power transmission of claim 1 wherein the governor means comprises means incrementally movable between discreet positions and coupled with the separate valve means to selectively communicate the conduit means with the control means of a selected module in each discreet position.

10. The power transmission of claim 9 wherein the incrementally movable means is mechanically responsive to rotating speed of the final output drive shaft.

11. A power transmission including a plurality of sequentially arranged speed ratio modules, each of the modules comprising a fixed housing, an input shaft, an output shaft, the output shaft of the first sequential module being coupled with the input shaft of the next sequential module, the output shaft of the last sequential module being coupled with a final output drive shaft of the power transmission, a planetary gear set having a sun gear, a ring gear and a plurality of planetary gears mounted upon a rotatable carrier and engaged with the ring gear and sun gear, the input shaft being coupled for rotation with the ring gear and the output shaft being coupled for rotation with the carrier, a direct drive clutch selectively operable to cause rotation of the ring gear together with the carrier, a self-energizing reduction brake to selectively lock the sun gear against rotation in response to torque forces acting upon the sun gear, and common actuating means responsive to a single signal for causing engagement of the direct drive clutch and rotation of the ring gear in common with the carrier and also conditioning the reduction clutch to prevent it from being engaged, the common actuating means also being responsive to termination of the single signal for causing disengagement of the direct drive clutch and also conditioning the reduction brake for selectively locking the sun gear against rotation in response to torque forces acting thereon, the power transmission also including a control system comprising a source of signal fluid under pressure, separate valve means for selectively communicating the signal fluid pressure to the respective common actuating means of each module, the plurality of separate valve means for the respective speed ratio modules each comprising a spool means having an effective length equal to the axial dimension of the respective module for abutting engagement with the spool means in an adjacently arranged speed ratio module, and governor means operatively coupled to the output drive shaft and to each of the separate valve means, the governor means conditioning the valve means for sequentially communicating the signal fluid pressure to the common actuating means of the respective modules relative to the operating speed of the output drive shaft, the governor means comprising means incrementally movable between discreet positions and operatively coupled with the separate valve means to selectively communicate the signal fluid pressure to a selected module in each discreet position, the governor means also comprising operating means arranged for interaction with one end of the continuously extending spool means.

12. A power transmission including a plurality of similar, sequentially arranged speed ratio modules, each of the modules comprising an input shaft, an output shaft, the output shaft of each module within the sequence being coupled with the input shaft of the next adjacent modules, the output shaft of the last sequential module being operatively coupled with a final output drive shaft, a gear set operatively coupled with the input shaft and the output shaft while being operable to provide both direct and reduction drive across the respective module, friction means responsive to a single signal and operatively coupled with the respective gear set to selectively establish both direct and reduction drive, the power transmission also including means for securing fixed housing portions of the respective modules together to form an enclosure for the complete power transmission and a control system comprising a source of signal fluid under pressure, separate valve means for selectively communicating the signal fluid pressure with the friction means of each module, each valve means comprising a spool of substantially the same length as the axial dimension of the respective module, the spools being arranged in abutting relation within a bore formed by means extending through the sequentially arranged speed modules, a governor operatively coupled with the final output shaft of the power transmission and including means acting upon one axial end of the abutting sequence of spools, the governor means positioning the spools to sequentially communicate the signal fluid pressure with the respective friction means in the modules relative to the operating speed of the output shaft, and resilient means axially acting upon one end of the abutting sequence of spools to maintain them in engagement with each other and with the governor means.

13. The power transmission of claim 12 wherein the governor means acting upon the spools is incrementally movable between discreet positions in response to operating speed of the final output drive shaft and operable to communicate the signal fluid pressure with the friction means of a selected module in each discreet position.

14. The power transmission of claim 12 wherein each of the separate valve means is operable to communicate the signal fluid pressure into a common passage for the friction means of the respective modules in response to the governor means.

15. The power transmission of claim 14 wherein the friction means of each module comprises a plurality of friction devices responsive to pressure variations in the common passage.

* * * * *